May 11, 1926.
W. F. SCHACHT
PEDAL COVER PAD
1,584,659
Filed Feb. 3, 1926
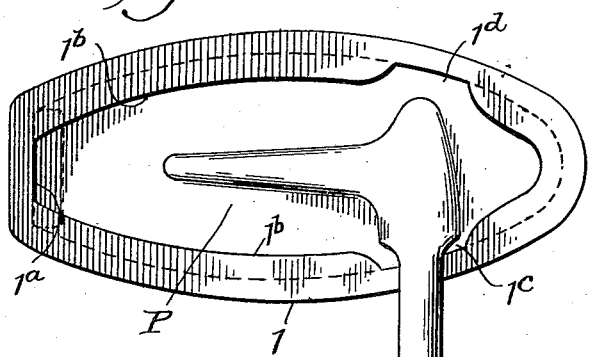
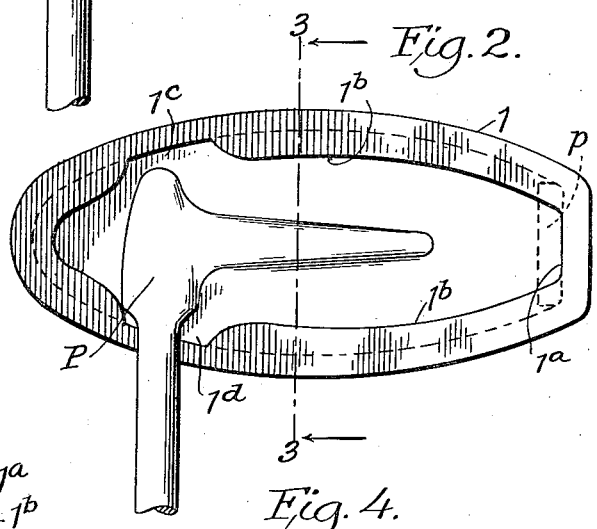
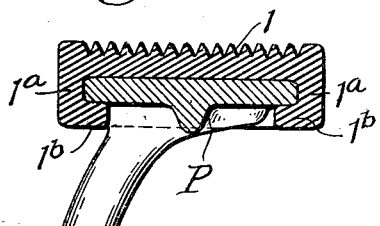
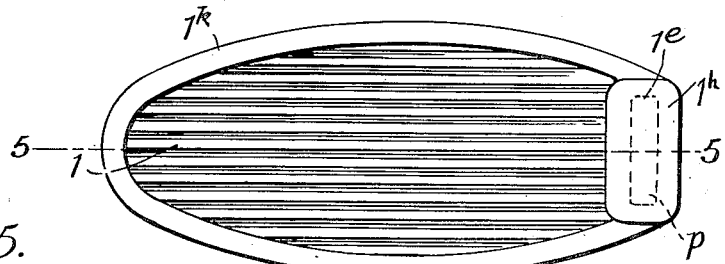
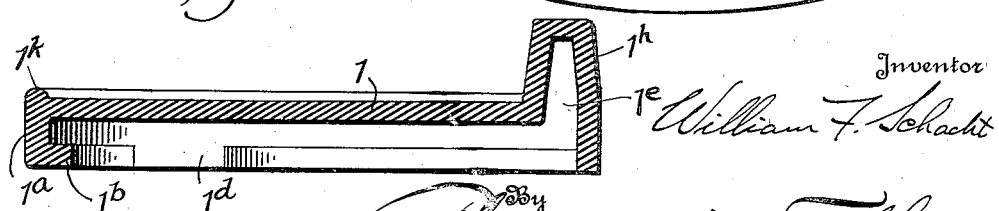
Inventor
William F. Schacht
By Alexander T. Lowell
Attorneys

Patented May 11, 1926.

1,584,659

UNITED STATES PATENT OFFICE.

WILLIAM F. SCHACHT, OF HUNTINGTON, INDIANA.

PEDAL COVER PAD.

Application filed February 3, 1926. Serial No. 85,674.

This invention is a novel improvement in pedal covers particularly designed for use on the foot pedals of Ford automobiles, in which two outer pedals have raised projections on the ends, the pedals being rights and lefts. Various anti-slipping devices or covers have been heretofore made for the Ford pedals, but such covers have necessarily been preformed rights and lefts, and if a cover which would fit the right pedal it would not fit the left, and vice versa. This occasioned a great deal of annoyance in the trade, and necessitated making right and left covers, and consequently entailed expense in the manufacture, and annoyance to the users, who would have to know for what pedal he wanted a cover, and be sure that he got a right or left pedal cover.

The principal object of the present invention is to provide a rubber cover for such pedals which can be used on either right or left pedals and can be readily applied and secured to either pedal by the owner without any extraneous or auxiliary fastening devices, and without requiring the aid of a mechanic in so doing, and which covers can be sold either as rights or lefts, as they will fit either equally well.

I will explain the invention with reference to the accompanying drawing which illustrates one practical embodiment thereof to enable others to adopt and use the same, and will summarize in the claim the novel features of construction for which protection is desired.

In said drawings:

Fig. 1 illustrates the pad applied to the right pedal.

Fig. 2 is a similar view thereof applied to the left pedal.

Fig. 3 is a transverse section on the line 3—3, Fig. 2, of a pedal cover detached.

Fig. 4 is a top plan view of the cover.

Fig. 5 is a longitudinal section on the line 5—5, Fig. 4.

As shown, the pedal cover comprises a body portion 1 preferably of rubber, which approximately conforms in contour to the pedal P, to which it is to be attached. It might be noted here that the right and left pedals are similar in size, but the left pedal is attached to a shank or lever which extends from the right hand end of this pedal, while the right pedal is attached to the shank which extends from the left hand end of such pedal, as shown in Figures 1 and 2. Consequently, as stated, it has heretofore been necessary to provide preformed right and left covers to fit the right and left pedals because of these shanks.

As stated my pad is made of corresponding contour with the contour of the pedal, and it is provided with a depending flange $1^a$ adapted to fit around the edge of the pedal, and this latter flange is provided with an inwardly projecting lip $1^b$ which extends under the pedal, the lip engaging the opposite sides and one end of the pedal, as indicated in Figs. 2 and 5, but this undercut flange or lip $1^b$ is cut away at the point $1^c$ to accommodate the shank of the right hand pedal, and is cut away at $1^d$ to accommodate the shank of the left hand pedal, and this enables the pad to be retained thereon by the flange, as is obvious.

Usually the pedal is provided with an upwardly projecting stop $p$ at the opposite end of the pedal. To accommodate this projection or stop the cover 1 may be provided with an aperture $1^e$ at its end through which aperture the said stop $p$ may project. Preferably the cover is provided with an integral housing $1^h$ on its upper side which will cover the projection or stop $p$ as shown in Figure 4.

It will be seen that the essential novel feature of the pedal cover is that the lip $1^b$ on the flange $1^a$ is cut out as at $1^c$, $1^d$ on both sides so that the pad may be reversed to fit either right or left pedals. In other words, the pedal is provided with a gripping part on its flange which is irregularly shaped to enable the rubber pad to be fitted to either the right or left pedal. But for this irregular or cut-away flange it would be necessary to make separate covers, one for the right and one for the left pedal.

The sides $1^a$ of the cover can be slightly concave if desired, and the outer face can be finished in any suitable way, i. e., flat, convex, plain or corrugated, but preferably longitudinally corrugated as shown in Fig. 4, and provided with a border molding $1^k$ around the top edges thereof, to impart a neat appearance thereto.

If desired the rubber of the pad might be reinforced by layers of fabric embedded therein during the molding process, as is quite common in the manufacture of molded rubber articles.

I claim:

A cover pad attachable to either a right or left pedal, such pedals being respectively attached at opposite sides to their shanks; comprising a body approximately conforming to the plan contour of both such pedals and provided with a depending flange adapted to engage the sides of the pedal, said flange having an inwardly projecting lip adapted to engage the underside of the pedal adjacent the sides thereof to confine the pad thereon, said lip being cut away at opposite sides of the pad adjacent one end thereof to enable the pad to be applied to either a right or a left pedal.

In testimony that I claim the foregoing as my own, I affix my signature.

WILLIAM F. SCHACHT.